Feb. 14, 1928.
L. A. BROWN
1,658,832
SAFETY ELECTRIC COUPLER
Filed Jan. 5, 1926
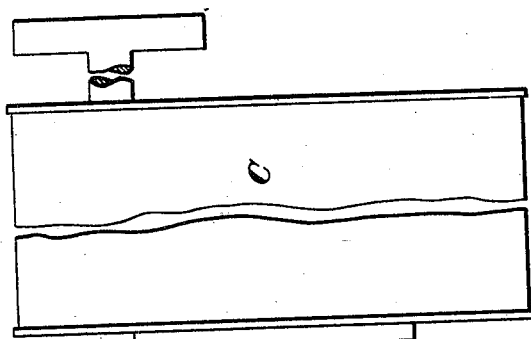
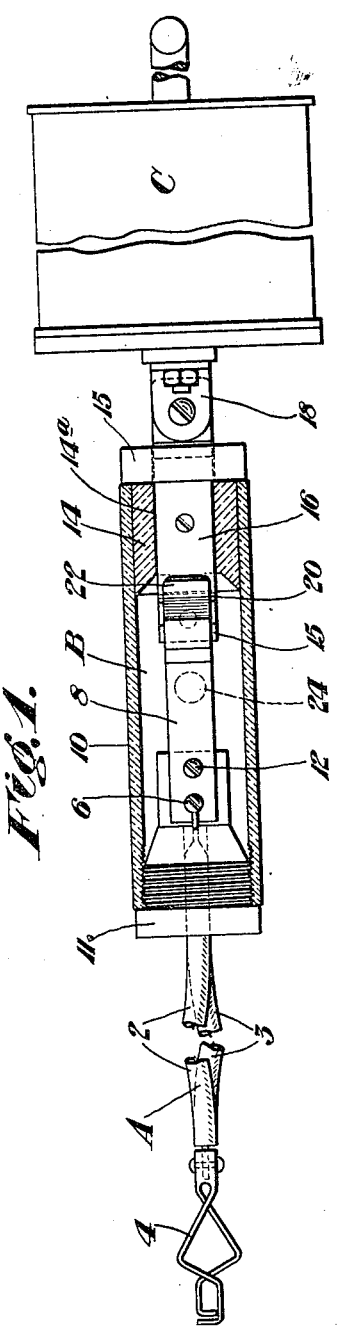
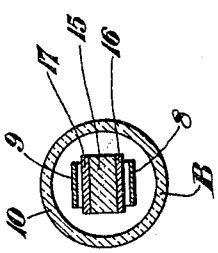
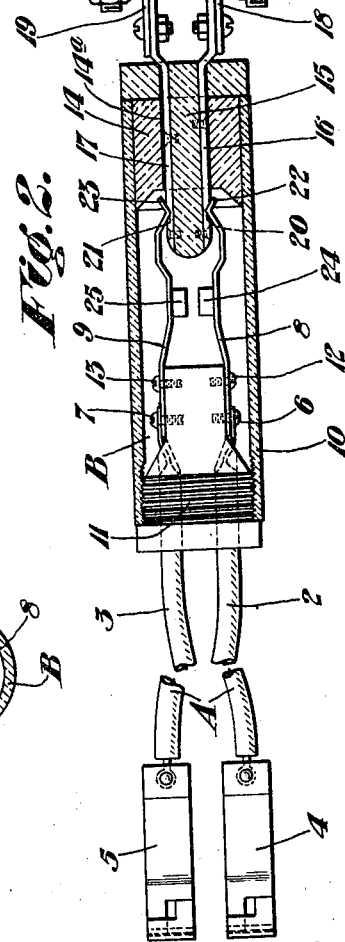
Witnesses:
Edwin Trueb
Inventor:
LADURA ALEXANDER BROWN,
by D. Anthony Nama
his Attorney Patented Feb. 14, 1928.

1,658,832

UNITED STATES PATENT OFFICE.

LADURA ALEXANDER BROWN, OF UNIONTOWN, PENNSYLVANIA.

SAFETY ELECTRIC COUPLER.

Application filed January 5, 1926. Serial No. 79,368.

This invention relates to electric couplers or connectors and, while not limited thereto, is especially adapted for connecting shot firing cables used in mines to a magneto, battery or other source of current.

The principal object of the present invention is to provide a coupler of this class which will normally short circuit the shot firing cable thereby preventing stray currents of electricity traveling through said cable from causing premature firing of the shot.

Another object is to provide a coupler which will facilitate the connecting and disconnecting of a cable to a source of power.

It is now the practice in firing shots in a mine, for the shot firer to lay his cable, which is 100 feet or so in length, along the mine entry where the shot is located. He then attaches the cable to the shot and goes back to the other end of the cable and attaches the cable to a magneto or battery, either of which may be used to supply the electric current for firing the shot. If a magneto is used it is set in motion after the cable is attached to generate current to fire the shot, while if a battery is used a switch is operated to complete the circuit through the cable.

After the shot is fired, the shot firer disconnects the cable from the source of electric current and then proceeds to connect the other end to a new shot.

When the cable is laid on the mine floor while it is being connected to the shots, it is possible for the ends of the cable, or other parts of the cable on which the insulation has been broken, to come into contact with ground, track rails, or pipe lines and thereby pick up stray currents from the trolley system or other source and thereby cause a premature explosion of the shot.

By the use of the present coupler any danger of a premature explosion from the above causes is entirely eliminated, since the coupler short circuits the wires of the cable and forms a path for any stray currents picked up which is of less resistance than the spark gap path through the shot.

In the drawings:

Figure 1 is a side elevation, partly in section, showing my improved coupler connecting a shot firing cable to a magneto.

Figure 2 is a plan view of the same also partly in section.

Figure 3 is a sectional view through the contact finger and plug.

Referring more particularly to the drawings, the letter A designates a shot firing cable which is composed of two insulated wires 2 and 3 twisted together and provided at one end with universal connector clips 4 and 5 for connection with the wire leads extending outwardly through the coal face from a shot. The other ends of the wires 2 and 3 of cable A are secured to screw posts 6 and 7 which are in electrical contact with spring contact fingers 8 and 9, respectively, of the coupler B.

The coupler B comprises a receiving portion or jack composed of a tubular insulating casing or housing 10 having its rear end internally threaded to receive a threaded end piece or block 11 which forms a support for the spring contact fingers 8 and 9. The fingers 8 and 9 are secured in place by screws 12 and 13 and the screw posts 6 and 7, respectively.

The forward end of the casing 10 is closed by a wall 14 which is provided with a centrally arranged port or opening 14ª for the reception of a contact plug composed of a body portion 15 of insulating material and a pair of contact strips or plates 16 and 17 mounted on opposite sides of said body portion so as to be insulated from each other.

The strips or plates 16 and 17 extend rearwardly beyond the body portion 15 of the plug and are hingedly secured to a pair of binding arms 18 and 19 adapted to be secured to the binding post of the magneto C, which is of standard construction. If a shot firing battery is used instead of a magneto as a source of current the arms 18 and 19 would be secured to the binding posts on the battery switch or key.

The strips or plates 16 and 17 are adapted to contact with the fingers 8 and 9 to form an electrical connection between the source of current and the cable. The strips 16 and 17 are provided with recesses 20 and 21 adapted to receive projections 22 and 23 of the fingers 8 and 9 to prevent accidental disengagement of the parts.

The spring fingers 8 and 9 are provided with contact buttons 24 and 25, respectively, which are normally in contact with each other thereby short circuiting the fingers 8 and 9, and which are separated so as to break the short-circuit when the contact plug is forced between the fingers 8 and 9.

In operation the receiving portion or jack of the coupler is separated from the plug and secured to the cable while the plug portion is secured to the source of current supply.

When the receiving portion or jack of the coupler is separated from the plug the contact buttons 24 and 25 will be forced into contact by the spring fingers 8 and 9, thereby forming a short circuit of the cable wires through the fingers 8 and 9 and the buttons 24 and 25.

Since the ends of the cable are enclosed within the insulating casing 10 it is impossible for them to pick up any stray currents, and if any breaks in the cable insulation should permit stray currents to enter the cable, such currents would flow through the fingers 8 and 9 and contact buttons 24 and 25 back to ground as the path of least resistance instead of through the spark gap at the shot, thereby entirely eliminating the possibility of a premature explosion from this cause.

While I have shown and described one specific embodiment of my invention, it will be understood that I do not wish to be limited thereto since various modifications in details may be made without departing from the scope of my invention as defined in the appended claim.

I claim:

In a safety coupler for connecting shot firing cables to a source of electric current, a socket member comprising a tubular casing composed wholly of insulating material, plugs closing the ends of said casing and also composed wholly of insulating material, one of said end plugs being provided with a centrally arranged integral post portion, a pair of spring contact fingers secured to and supported on the opposite sides of said post portion of said plug and extending inwardly within said casing in parallel and spaced relation, the other of said end plugs being apertured to permit the entrance of a connecting plug adapted to connect with said contact fingers, said fingers being reversely bent adjacent their forward ends to form relatively sharp knife-like inwardly projecting contact edges adapted to contact with the connecting plug, said first named end plug being apertured at spaced points to permit the entrance of the separate wires of a shot firing cable, said wires being secured to and in electrical contact with said fingers, and a pair of contact buttons on said fingers at a point intermediate the ends thereof, and beyond the limit of the connecting plug so as not to be engaged thereby, said buttons being adapted to be normally engaged with each other when the connecting plug is out of engagement with said fingers so as to form a short circuit through said fingers.

In testimony whereof, I have hereunto set my hand.

LADURA ALEXANDER BROWN.